US008119243B2

(12) United States Patent
Froitzheim et al.

(10) Patent No.: US 8,119,243 B2
(45) Date of Patent: Feb. 21, 2012

(54) COATED ARTICLES

(75) Inventors: Michael Froitzheim, Dormagen (DE); Josef Heppekausen, Wesseling (DE)

(73) Assignee: Oerlikon Leybold Vacuum GmbH, Cologne (DE)

( * ) Notice: Subject to any disclaimer, the term of this patent is extended or adjusted under 35 U.S.C. 154(b) by 1030 days.

(21) Appl. No.: 12/063,788

(22) PCT Filed: Aug. 17, 2006

(86) PCT No.: PCT/EP2006/065402

§ 371 (c)(1),
(2), (4) Date: Feb. 14, 2008

(87) PCT Pub. No.: WO2007/025868

PCT Pub. Date: Mar. 8, 2007

(65) Prior Publication Data

US 2009/0068451 A1 Mar. 12, 2009

(30) Foreign Application Priority Data

Aug. 27, 2005 (DE) ......................... 10 2005 040 648

(51) Int. Cl.
*B32B 27/00* (2006.01)
*B32B 15/04* (2006.01)
*B05D 3/00* (2006.01)
*B05D 3/12* (2006.01)
*B05D 3/02* (2006.01)
*C23C 28/00* (2006.01)
*C25D 11/18* (2006.01)

(52) U.S. Cl. ........ 428/421; 428/457; 427/294; 427/238; 427/331; 427/372.2; 205/188; 205/189; 205/190; 205/198; 205/201; 205/204; 205/322; 205/324; 205/325; 205/333

(58) Field of Classification Search ........................ None
See application file for complete search history.

(56) References Cited

U.S. PATENT DOCUMENTS

| | | | | |
|---|---|---|---|---|
| 5,487,825 | A * | 1/1996 | Kurze et al. | 205/200 |
| 5,938,406 | A * | 8/1999 | Cerruti | 416/241 R |
| 7,323,221 | B2 * | 1/2008 | Heppekausen et al. | 427/294 |

FOREIGN PATENT DOCUMENTS

| | | | |
|---|---|---|---|
| DE | 1646153 | | 5/1965 |
| DE | 299595 DD | | 4/1992 |
| DE | 4142730 | C2 | 1/1993 |
| DE | 4239391 | A1 | 6/1993 |
| DE | 4239391 | C2 | 6/1993 |
| EP | 0545230 | A1 | 11/1992 |
| EP | 1485622 | B1 | 12/2002 |
| JP | 8281868 | | 10/1996 |
| WO | 98/18570 | A1 | 5/1998 |

OTHER PUBLICATIONS

"Vacu-Cell (tm) Parylene-C Coatings", Jul. 21, 2005, C&L Instruments, XP002413024, retrieved from the Internet: URL: http://web.archive.org/web/20050721075209/http://www.fluorescence.com/products/vc/parylene.htm> , pp. 1-3.

"Kelpa-Coat", Jun. 12, 2004, AHC Oberflachentechnik, XP002413043, Retrieved from the Internet: URL:http://web.archive.org/web/20040612114952/http://ahc-surface.com/patente/p_kepla.htm>.

* cited by examiner

*Primary Examiner* — Sheeba Ahmed

(74) *Attorney, Agent, or Firm* — Harness, Dickey & Pierce, PLC

(57) ABSTRACT

The invention relates to a process for the coating of objects made of valve metals selected from aluminum, magnesium, titanium, niobium and/or zirconium and their alloys with an oxide ceramic layer formed from the metal which has a thin barrier layer as a boundary layer towards the metal whose surface has been coated with polymers, characterized in that said polymers are introduced into the capillary system of the oxide ceramic layer in the form of dimers or halogenated dimers of general formula I (I)

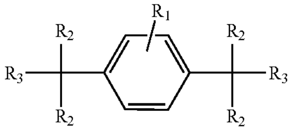

wherein
$R_1$ represents one or more hydrogen or halogen residues;
each $R_2$ represents hydrogen or halogen; and
$R_3$ commonly represent a corresponding xylylene residue for completing a dimeric structure;
by vacuum coating, followed by polymerizing the dimers.

12 Claims, No Drawings

COATED ARTICLES

FIELD

The present disclosure relates to a process for the coating of objects made of valve metals selected from Al, Mg, Ti, Nb and/or Zr or their alloys, and to the objects thus obtained.

BACKGROUND

EP 0 545 230 A1 relates to a method for producing optionally modified oxide ceramic layers on barrier-layer-forming metals and products obtained. To increase the thickness and wear resistance of oxide ceramic layers on barrier-layer-forming metals, a plasma-chemical anodic oxidation is performed in a chloride-free electrolyte bath having a pH value of from 2 to 8 at a constant current density of at least 1 $A/dm^2$ until the voltage reaches a final value. On objects of aluminum or aluminum alloys, an oxide ceramic layer consisting of corundum can be produced. Also on magnesium and titanium, layer thicknesses of up to 150 μm are achieved.

For many applications, highly loaded component parts of valve metals must be corrosion-resistant and wear-resistant even under extreme conditions. This is achieved by providing such objects with an oxide ceramic layer having a wide-meshed interlinked capillary system, introducing particles of fluoropolymers which at least in one dimension are smaller than the diameter of the capillaries, and exposing the object with the prefilled capillary system to changing pressure conditions.

DE 41 24 730 C2 relates to a method for incorporating fluoropolymers into microporous surfaces of objects made of aluminum or its alloys prepared by anodic oxidation, characterized in that an aqueous suspension of fluoropolymers or their precursors having a particle size of from 1 to 50 nm is incorporated into the capillaries of a hard anodized aluminum layer which are perpendicular to the metal.

DE 42 39 391 C2 relates to objects of aluminum, magnesium or titanium having an oxide ceramic layer filled with fluoropolymers, and to methods for preparing them. Described are objects made of the barrier-layer-forming metal having a thin firmly adhering barrier layer on the metal superposed by a sintered dense oxide ceramic layer and, on top of this, an oxide ceramic layer with a wide-meshed interlinked capillary system which is essentially filled with fluoropolymers. In particular, the oxide ceramic layer has a thickness of from 40 to 150 μm. Examples of such objects are rotors for turbo-molecular pumps, turbochargers for diesel or gasoline engines, component parts from vacuum or plasma technology, rollers for coronary discharges, and ultrasonic sonotrodes, each of aluminum or aluminum alloys. It is described that particles of the fluoropolymers or its precursor which are to be introduced into the outer oxide ceramic layer, unless being liquids, are introduced as a solution or suspension in a suitable solvent. The essential core of this description is subjecting the particles of fluoropolymers in a suitable solvent to changing pressure conditions, for which an impregnating system is suitable in which the air is first removed from the capillary system of the oxide ceramic layer using a vacuum, and subsequently, under the action of the vacuum, the particles enter the pores and, after the vacuum has been released, are pressed into pores by the atmospheric pressure and thus are supposed to reach fine ramifications as well.

As particularly suitable fluoropolymers, there are described, in particular, the polymers and copolymers of tetrafluoroethylene, hexafluoropropene, vinylidene fluoride, vinyl fluoride and trifluorochloroethylene. These fluoropolymers are known to be soluble in virtually no solvent, so that it is to be considered that these fluoropolymers are introduced into the surface in the form of dispersions according to DE 42 39 391 C2.

A similar process is described in Japanese Patent JP 2,913,537. A corrosion-resistant construction is characterized in that a plated layer of an Ni—P alloy having a thickness of about 20 μm is provided in an aluminum/alloy part of a turbomolecular pump for releasing chlorine gas in semiconductor production devices, which part comes into contact with chlorine gas, and that a fluororesin protective layer is formed on said plated layer by immersing a rotor and a stator of said turbo-molecular pump into a liquid for forming the layer of fluororesin, followed by drying.

EP 1 485 622 B1 relates to a process for the coating of objects made of valve metals selected from aluminum, magnesium, titanium, niobium and/or zirconium and their alloys with a thin barrier layer consisting of the metal and an oxide ceramic layer provided thereon whose surface has been coated with fluoropolymers, characterized in that the fluoropolymers are introduced into the capillary system of the oxide ceramic layer in the form of a solution by vacuum impregnation, followed by removing the non-wetting portions of the solution and drying.

The above mentioned prior art documents have the common feature that the fluoropolymers are essentially provided on the outer surface of the oxide-ceramic layer, but enter the ramifications only to a low extent.

SUMMARY

Thus, it is the object of the present invention to improve the uniformity of the coating and thus the sealing property of objects, especially oxide-ceramic layers.

DETAILED DESCRIPTION

In a first embodiment, the above object is achieved by a process for the coating of objects made of valve metals selected from aluminum, magnesium, titanium, niobium and/or zirconium and their alloys with an oxide ceramic layer formed from the metal which has a thin barrier layer as a boundary layer towards the metal whose surface has been coated with polymers, characterized in that said polymers are introduced into the capillary system of the oxide ceramic layer in the form of dimers or halogenated dimers of general formula I (I)

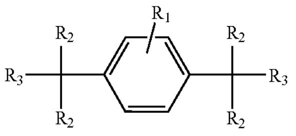

wherein

R1 represents one or more hydrogen or halogen residues;

each $R_2$ represents hydrogen or halogen; and $R_3$ commonly represent a corresponding xylylene residue for completing a dimeric structure;

by vacuum coating, followed by polymerizing the dimers.

The general formula (I) represents the monomer of the dimeric structure.

By the aftertreatment of oxide or ceramic layers, especially anodically produced ones, by vacuum coating with dimers or halogenated dimers, the properties with respect to the tightness of the protective layers can be substantially improved over the prior art. Another advantage in the application of the polymers obtained resides in their extremely high resistances towards aggressive and corrosive media. These media may be gaseous, for example, in the use of turbo-molecular pumps in plasma etchers, but may also comprise liquids or vapors of acids or alkalis.

It is assumed that the dimers monomerize first, followed by polymerization of the thus formed free radicals.

Similarly, the use of monomers or halogenated monomers is also possible directly without the necessity of a previous applied coating of an oxidic or ceramic kind. The thus treated surfaces are also characterized by particular properties, such as the repelling of soil or dust particles, and non-wettability by media such as water, oils or other liquids.

Using the present invention, it is possible to significantly improve the uniformity of the coating of porous surfaces over the prior art. To achieve this, it is particularly helpful that the application of the above mentioned layers is effected under vacuum in which gaseous monomers or halogenated monomers enter the pores or microscopically small cavities in the layers and polymerize therein.

The advantages of the coatings according to the invention reside, on the one hand, in the very low surface energy, and on the other hand, in an optimum resistance and impermeability towards almost all solvents and gases, which include, in particular, solvents, oils, (also silicone oils) and water-based liquids. Solids can also deposit on the surface of the film only with difficulty. In addition, the property of polymerization causes a very good adhesion to the valve metals as well as to their oxide ceramic layers as described above. Further to be pointed out is a high chemical, thermal and electrical stability which remains unaffected by the usual operation conditions to which the treated surfaces are exposed.

Within the meaning of the present invention, aluminum, magnesium, titanium, niobium or zirconium and their alloys are employed as the valve metal.

To be pointed out here particularly are aluminum and aluminum alloys, which are frequently employed for preparing rotors in turbo-molecular pumps.

The term "aluminum and its alloys" as used in the present invention means superpure aluminum and alloys of the groups 2xxx, 3xxx, 5xxx, 6xxx and 7xxx according to DIN EN5731-4 as well as cast alloys according to DIN EN1706.

Further suitable for the purposes of the invention are, in addition to pure magnesium, especially the magnesium cast alloys with the ASTM designations AS41, AM60, AZ61, AZ63, AZ81, AZ91, AZ92, HK31, QE22, ZE41, ZH62, ZK51, ZK61, EZ33, HZ32, and the kneaded alloys AZ31, AZ61, AZ80, M1 ZK60, ZK40.

Further, pure titanium or else titanium alloys, such as $TiAl_6V_4$, $TiAl_5Fe_{2.5}$ and others, may also be employed.

It is particularly preferred according to the present invention for the oxide ceramic layer to be prepared from a more or less graded material in which the oxide ceramic layer comprises a dense barrier layer as a boundary layer towards the valve metal, which is followed by a microporous layer structure which, towards the surface, becomes a wide-meshed interlinked capillary structure. Corresponding oxide ceramic layers are known, for example, from DE 42 39 391 C2.

Also according to the present invention, plasma-chemical oxide ceramic layers, but also other oxidic layers, such as those applied by electrochemical anodization, are employed with a thickness of from 10 to 50 μm, especially from 20 to 40 μm, as also known from DE 42 39 391 C2.

The monomers or halogenated monomers which may be employed according to the present invention are preferably selected from dimers of p-xylylene or dimers of halogenated para-xylylene of general formula I.

Under the designation of "Parylene™", xylylene derivatives are sold by the company Parylene Coating Services Inc. or by the Uniglobal Kisco Inc. as a coating material for a wide variety of purposes. Parylene™ is a coating which is applied under vacuum by condensation from the gas phase to the substrate as a pore-free and transparent polymer film. Virtually any substrate material, for example, metal, glass, paper, paint, plastic, ceramic, ferrite and silicones, can be coated with Parylene™. In one operation, coating thicknesses of from 0.1 to 50 μm can be applied. Parylene™ coatings are hydrophobic, chemically resistant coatings with a good barrier effect against inorganic and organic media, strong acids, lyes, gases and water vapor. They have an excellent electric isolation with a high voltage resistance and low dielectric constant. The coatings are free of micropores and pinholes from a layer thickness of 0.2 μm. Thin and transparent coatings with a high crevice access property are suitable for substrates having a complex structure, even on edges. The coating of the substrates is effected without temperature load, especially at room temperature under vacuum. The coatings are temperature-resistant up to 220° C.

The starting materials are usually in the form of a dimer (di-para-xylylene) and are heated to about 150° C. to convert them to the corresponding gaseous monomer. The layer thickness and uniformity are controlled by the amount and purity of the dimer employed.

It is particularly preferred according to the present invention to apply the layers of poly-para-xylylenes in a thickness of from 0.5 to 15 μm, especially from 5 to 10 μm.

In a further embodiment, the invention comprises objects made of valve metals which can be obtained by the above mentioned method. It is particularly preferred according to the present invention for these objects to be component parts for turbo-molecular pumps, especially rotors or stators, which are mostly prepared from aluminum or aluminum alloys.

By means of the present invention, objects become obtainable which are characterized by an extremely low admittance of the surface, which could be shown by comparative measurements of the admittance of untreated oxide layers and vacuum-impregnated oxide layers.

In vacuum coating, the complete coating of the pores in the oxidic layer and thus of the entire surface is ensured. With the pore dimensions of layers produced by plasma chemistry, but also with anodic oxide layers, this approach is particularly advantageous.

The classical immersion treatment only reaches the wettable surface, but does not enter the pores (particularly the pores of hard anodic layers). In this connection, tests were performed on plasma-oxidic layers and showed a difference:

An admittance of 42 μS was established for a usual coating as compared to 7 μS for a vacuum coating according to the invention.

EXAMPLES

Example 1

A sample sheet of the 2xxx alloy group with a Kepla Coat coating (25 μm) and an admittance of 55 μS was coated with <10 μm of Parylene™ C according to the preparation method usual for parylenes.

After the vacuum coating, an admittance resulted which was no longer measurable.

For determining the admittance, a measuring cell with a contact area having a diameter of 2.3 mm was used. A potassium sulfate solution served as an auxiliary electrolyte. For the measurement itself, an "Anotest YD" of the Fischer company was employed.

What is claimed is:

1. A process for the coating of objects made of valve metals selected from the group consisting of aluminum, magnesium, titanium, niobium zirconium and their alloys with an oxide ceramic layer formed from the metal by plasma-chemical application which has a barrier layer as a boundary layer towards the metal whose surface has been coated with polymers, characterized in that said polymers are monomerized in the form of dimers or halogenated dimers according to general formula I (I)

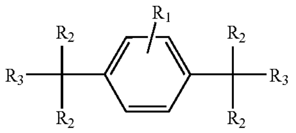

wherein $R_1$ represents one or more hydrogen or halogen residues;

each $R_2$ represents hydrogen or halogen; and $R_3$ commonly represent a corresponding xylylene residue for completing a dimeric structure;

and the monomers are introduced into the capillary system and on the surface of the oxide ceramic layer under vacuum and polymerized there.

2. The process according to claim 1, wherein an oxide ceramic layer is employed having a barrier layer as a boundary layer towards the valve metal, followed by a microporous layer structure which becomes a capillary structure towards the surface.

3. The process according to claim 1 wherein objects are coated with an oxide ceramic layer having a thickness of from 10 to 50 μm.

4. The process according to claim 1, wherein dimers selected from dimeric fluoroxylylenes, chloroxylylenes and/or hydrogen xylylenes are employed.

5. An object consisting of valve metals obtainable by a process according to claim 1.

6. The object according to claim 5, wherein the layer thickness of the polymers is from 0.5 to 15 μm.

7. The process according to claim 1, wherein objects are coated with an oxide ceramic layer having a thickness of from 20 to 40 μm.

8. The object according to claim 5, wherein said object is a turbo-molecular pump rotor formed from aluminum or aluminum alloys.

9. The object according to claim 5 wherein the layer thickness of the polymers is from 5 to 10 μm.

10. An object consisting of valve metals obtainable by a process according to claim 2.

11. An object consisting of valve metals obtainable by a process according to claim 3.

12. An object consisting of valve metals obtainable by a process according to claim 4.

* * * * *